US012775203B2

(12) United States Patent
Ho et al.

(10) Patent No.: US 12,775,203 B2
(45) Date of Patent: Oct. 27, 2026

(54) PROJECTION DEVICE AND COLOR WHEEL MODULE

(71) Applicant: Coretronic Corporation, Hsin-Chu (TW)

(72) Inventors: Wen-Ching Ho, Hsin-Chu (TW); Shi-Wen Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 269 days.

(21) Appl. No.: 18/592,476

(22) Filed: Feb. 29, 2024

(65) Prior Publication Data

US 2024/0302727 A1 Sep. 12, 2024

(30) Foreign Application Priority Data

Mar. 6, 2023 (CN) ......................... 202310201879.5

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC ............................ G03B 21/204; G02B 26/008
USPC .......................................................... 353/100
See application file for complete search history.

(56) References Cited

U.S. PATENT DOCUMENTS

2006/0126199 A1* 6/2006 Jia ........................ G02B 26/008 353/84
2008/0079909 A1* 4/2008 Lu .......................... G03B 33/08 353/84

FOREIGN PATENT DOCUMENTS

CN 111999970 11/2020
KR 20080003483 A * 1/2008 ........... G02B 26/008
TW 200732815 9/2007

OTHER PUBLICATIONS

Translation of KR_20080003483_A (Year: 2026).*

* cited by examiner

*Primary Examiner* — Jerry L Brooks
(74) *Attorney, Agent, or Firm* — JCIPRNET

(57) ABSTRACT

A projection device including a casing, an illumination system, a light valve, a first casing member, a second casing member and a projection lens. A color wheel module of the illumination system includes a fixing base, an optical assembly, a first connecting assembly and a second connecting assembly. A driving assembly of the optical assembly is connected to a center of a disk of the optical assembly. On a reference plane perpendicular to the central axis, an orthogonal projection of the first connecting portion and an orthogonal projection of the second connecting portion are respectively located on two sides of the central axis, wherein the first connecting portion of the fixing base is connected to the first casing member through the first connecting assembly, and the second connecting portion is connected to the second casing member through the second connecting assembly.

19 Claims, 10 Drawing Sheets

PROJECTION DEVICE AND COLOR WHEEL MODULE

CROSS-REFERENCE TO RELATED APPLICATION

This application claims the priority benefit of China application serial no. 202310201879.5 filed on Mar. 6, 2023. The entirety of the above-mentioned patent application is hereby incorporated by reference herein and made a part of this specification.

BACKGROUND

Technical Field

The invention relates to a display device, and particularly relates to a projection device configured with a color wheel module.

Description of Related Art

Generally, a rainbow effect is an image defect phenomenon that is easily produced by a digital light processing (DLP) projector using a color wheel filter module, and since light of various colors on a same image does not reach a display surface or screen at a same time, people may find different levels of the rainbow effect due to different sensitivities of human eyes. Some users may view a rainbow-like color light and shadow phenomenon of three primary colors of red, green and blue, which is also known as a color break-up (CBU) phenomenon. Since a color wheel adopts a rotation frequency higher than a reaction time of human eyes to present a full-color effect, however, in high-speed moving images, the light of three primary colors of red, green, and blue may be destroyed by a next image before it has a time to form an image in a retina of the human eyes, resulting in the color break-up phenomenon at edges of objects in the image.

In addition, since a structure of the existing color wheel module used in the projector may not be stable enough, the color wheel module is likely to produce vibration and noise when a rotation speed of the color wheel increases.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a color wheel module, which is adapted to avoid generating vibration and noise at a high speed.

The invention is directed to a projection device including the above-mentioned color wheel module.

Additional aspects and advantages of the present invention will be set forth in the description of the techniques disclosed in the present invention.

In order to achieve one or a portion of or all of the objects or other objects, an embodiment of the invention provides a projection device including a casing, an illumination system, a light valve, a first casing member, a second casing member and a projection lens. The illumination system, the light valve, the first casing member, the second casing member and at least a part of the projection lens are arranged in the casing. The illumination system is configured to provide an illumination light beam. The illumination system includes a color wheel module. The color wheel module includes a fixing base, an optical assembly, a first connecting assembly and a second connecting assembly. The optical assembly includes a disk and a driving assembly. The driving assembly is connected to a center of the disk for driving the disk to rotate around a central axis thereof. The fixing base is connected with the driving assembly, and the fixing base has a first connecting portion and a second connecting portion. On a reference plane perpendicular to the central axis, an orthogonal projection of the first connecting portion of the fixing base and an orthogonal projection of the second connecting portion of the fixing base are respectively located on two sides of the central axis, wherein the first casing member is connected to the second casing member, the first connecting portion of the fixing base is connected to the first casing member through the first connecting assembly, and the second connecting portion of the fixing base is connected to the second casing member through the second connecting assembly. The light valve is disposed on a transmission path of the illumination light beam, and is configured to convert the illumination light beam into an image light beam. The projection lens is disposed on a transmission path of the image light beam, and is configured to project the image light beam out of the projection device.

In order to achieve one or a portion of or all of the objects or other objects, an embodiment of the invention provides a color wheel module adapted to be disposed between a first casing member and a second casing member of a projection device. The color wheel module includes a fixing base, an optical assembly, a first connecting assembly and a second connecting assembly. The optical assembly includes a disk and a driving assembly. The driving assembly is connected to a center of the disk for driving the disk to rotate around a central axis thereof. The fixing base is connected with the driving assembly, and the fixing base has a first connecting portion and a second connecting portion. On a reference plane perpendicular to the central axis, an orthogonal projection of the first connecting portion of the fixing base and an orthogonal projection of the second connecting portion of the fixing base are respectively located on two sides of the central axis, the first casing member is connected to the second casing member, the first connecting portion of the fixing base is connected to the first casing member through the first connecting assembly, and the second connecting portion of the fixing base is connected to the second casing member through the second connecting assembly.

Based on the above description, the embodiments of the invention have at least one of the following advantages or effects. In an embodiment of the invention, the color wheel module includes the fixing base, which is connected to the first casing member of the projection device through the first connecting portion of the fixing base, the second connecting portion of the fixing base is connected to the second casing member of the projection device, so that the structure of the color wheel module may be stabilized to avoid producing vibration and noise at a high rotation speed. In this way, image quality may be further improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
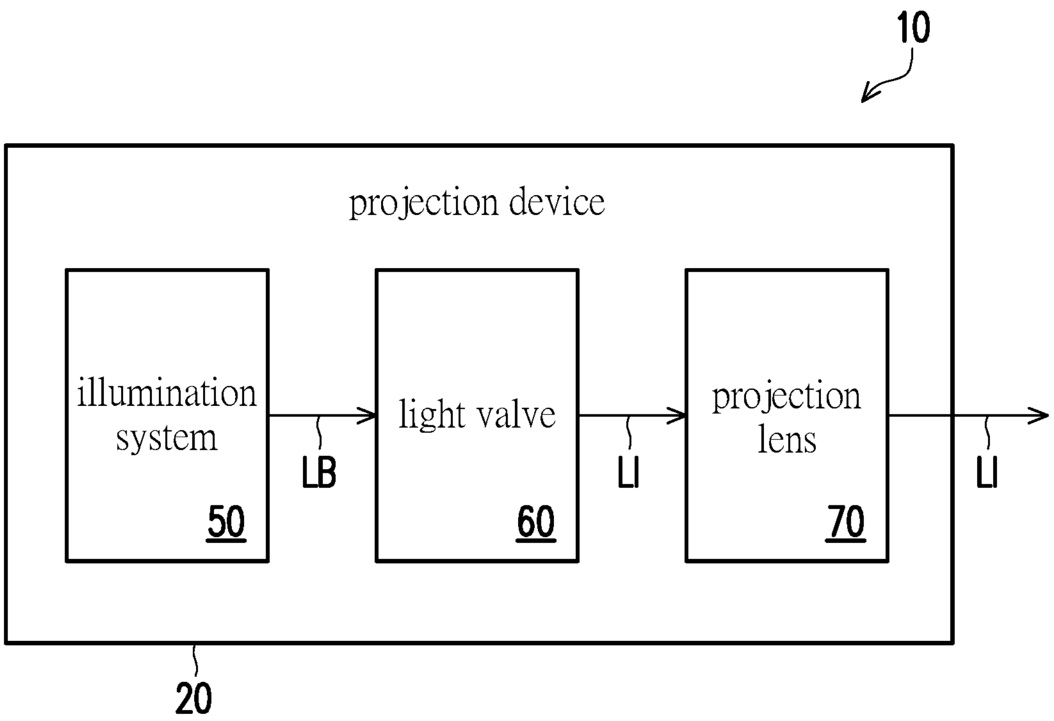
FIG. 1 is a schematic diagram of a projection device according to an embodiment of the invention.
Figure 2A:
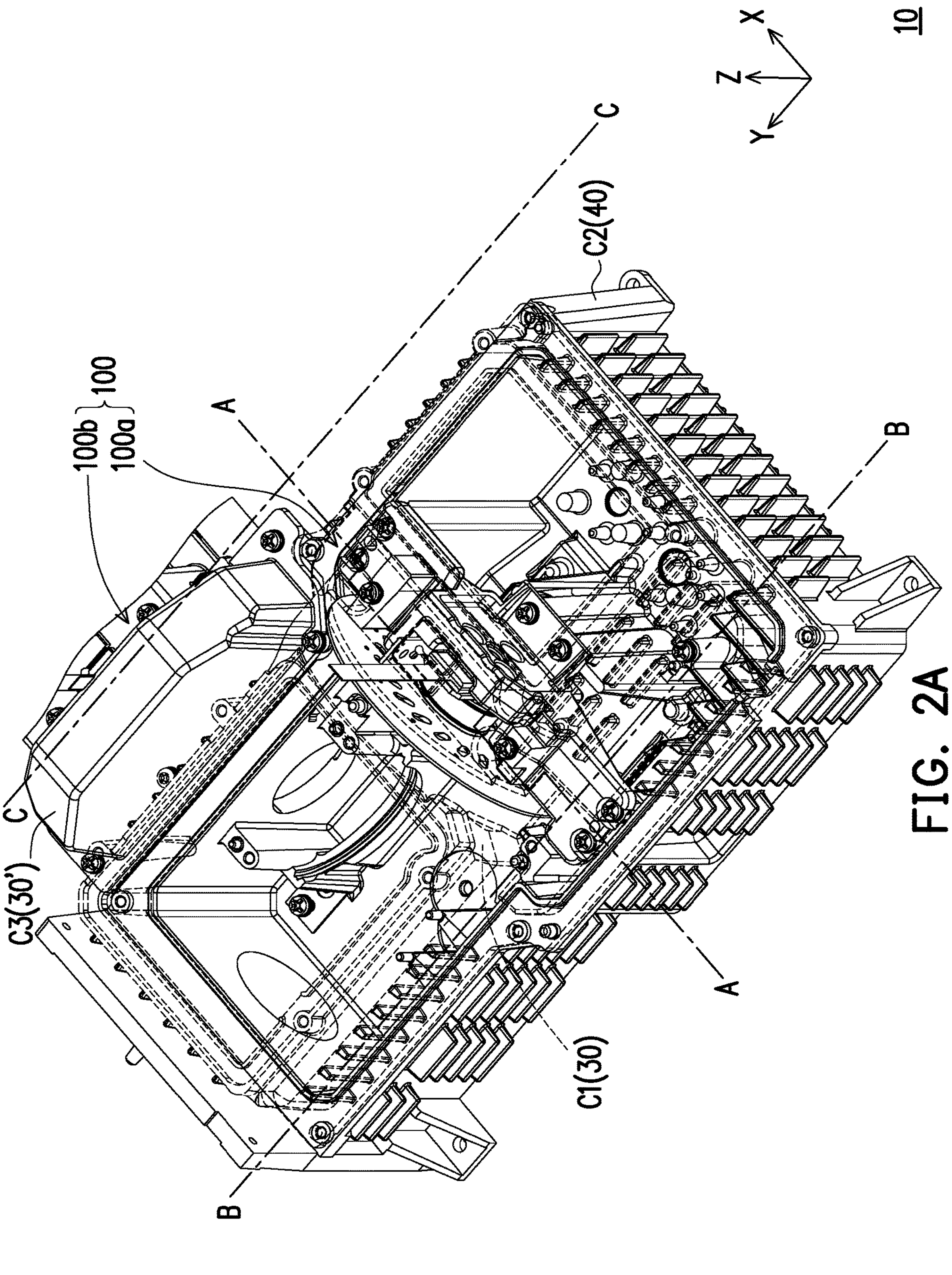
FIG. 2A is a schematic three-dimensional view of the projection device of FIG. 1.
Figure 2B:
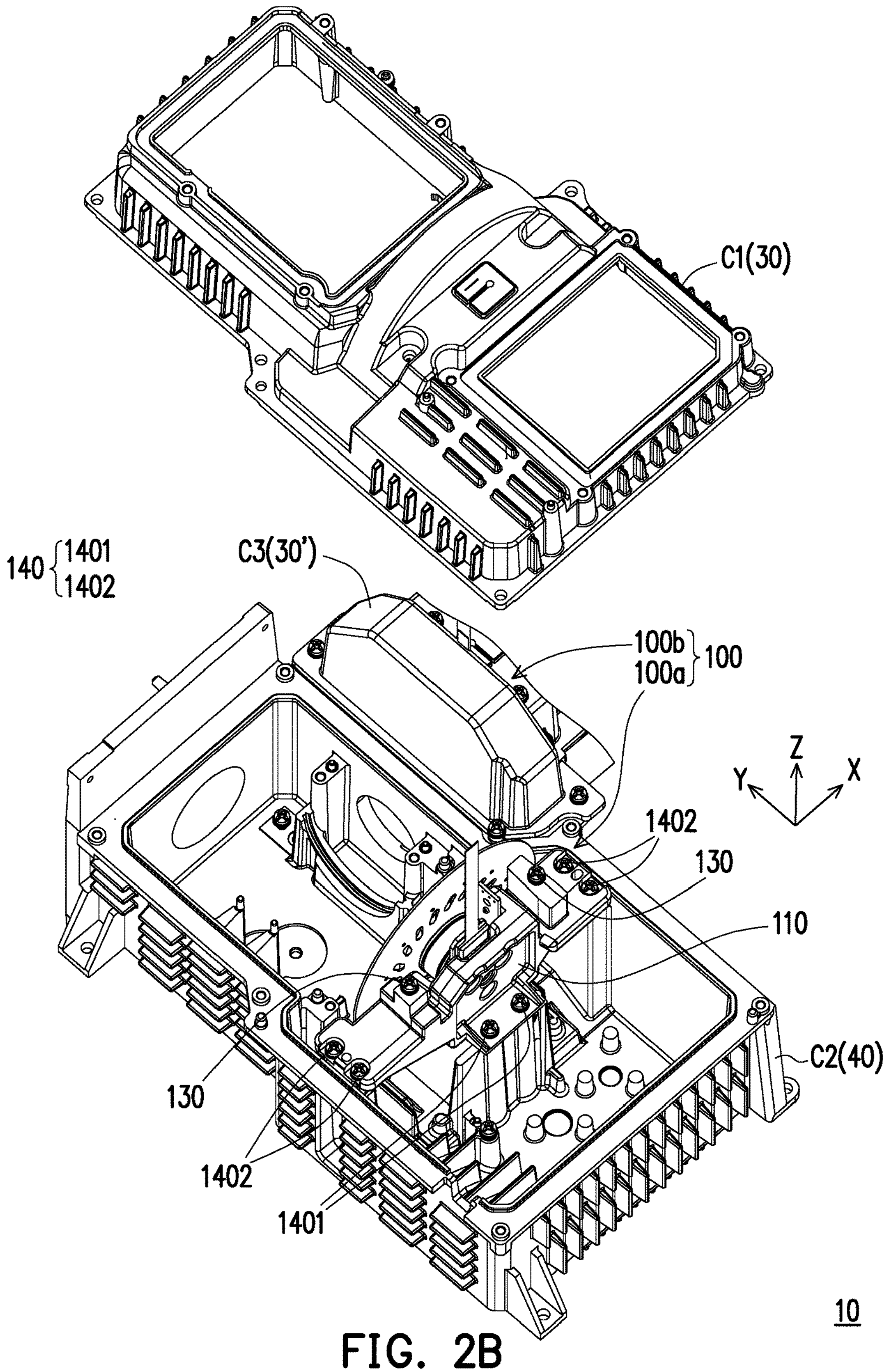
FIG. 2B is a schematic exploded view of the projection device of FIG. 2A.

FIG. 2A is a schematic three-dimensional view of the projection device of FIG. 1. FIG. 2B is a schematic exploded view of the projection device of FIG. 2A. It should be noted that an X direction, a Y direction, and a Z direction are marked in FIG. 2A and FIG. 2B to present a configuration relationship of the components in the drawings, and the X direction, the Y direction, and the Z direction are intersected with each other, but the invention is not limited thereto. Some irrelevant structures in FIG. 2A and FIG. 2B are omitted to facilitate display and identification of components to be explained.

Referring to FIG. 1 and FIG. 2B, the projection device (projector) 10 of the embodiment includes a casing 20, an illumination system 50, a light valve 60, and a projection lens 70. The illumination system 50 is configured to provide an illumination light beam LB. The light valve 60 is disposed on a transmission path of the illumination light beam LB for converting the illumination light beam LB into an image light beam LI. The projection lens 70 is disposed on a transmission path of the image light beam LI for projecting the image light beam LI out of the projection device 10 to a projection target (not shown), such as a screen or a wall. The projection device 10 is, for example, a digital light processing (DLP) projector or a laser projector.

In the embodiment, the projection device 10 further includes a first casing member 30 and a second casing member 40. The illumination system 50, the light valve 60, the first casing member 30, the second casing member 40 and at least a part of the projection lens 70 are disposed in the casing 20. In the embodiment, the illumination system 50 includes a color wheel module 100, and the color wheel module 100 includes a phosphor color wheel module 100*a* and/or a filter color wheel module 100*b*. In the embodiment, the color wheel module 100, for example, includes the phosphor color wheel module 100*a* and the filter color wheel module 100*b*. In other embodiments, the color filter wheel module 100*b* may not be configured according to actual requirements of the projection device.

Generally, a synchronous speed of the phosphor color wheel module and the filter color wheel module of a conventional DLP projector is a 2× speed of 7200 rpm (revolution per minutes), which is easy to produce a rainbow effect. The synchronous speed of the phosphor color wheel module and the filter color wheel module of the projection device provided by the invention may reach a 3× speed of 10800 rpm or a 4× speed of 14400 rpm, which may mitigate the rainbow effect of the projection device and avoid generating vibration and noise. It is also possible to reduce a noise level in the projection device with the color wheel module of the 2× speed of 7200 rpm. In addition, by applying the color wheel module with 4× speed of 14400 rpm to a 2K projection device, it also has an effect of improving brightness.

Figure 3A:
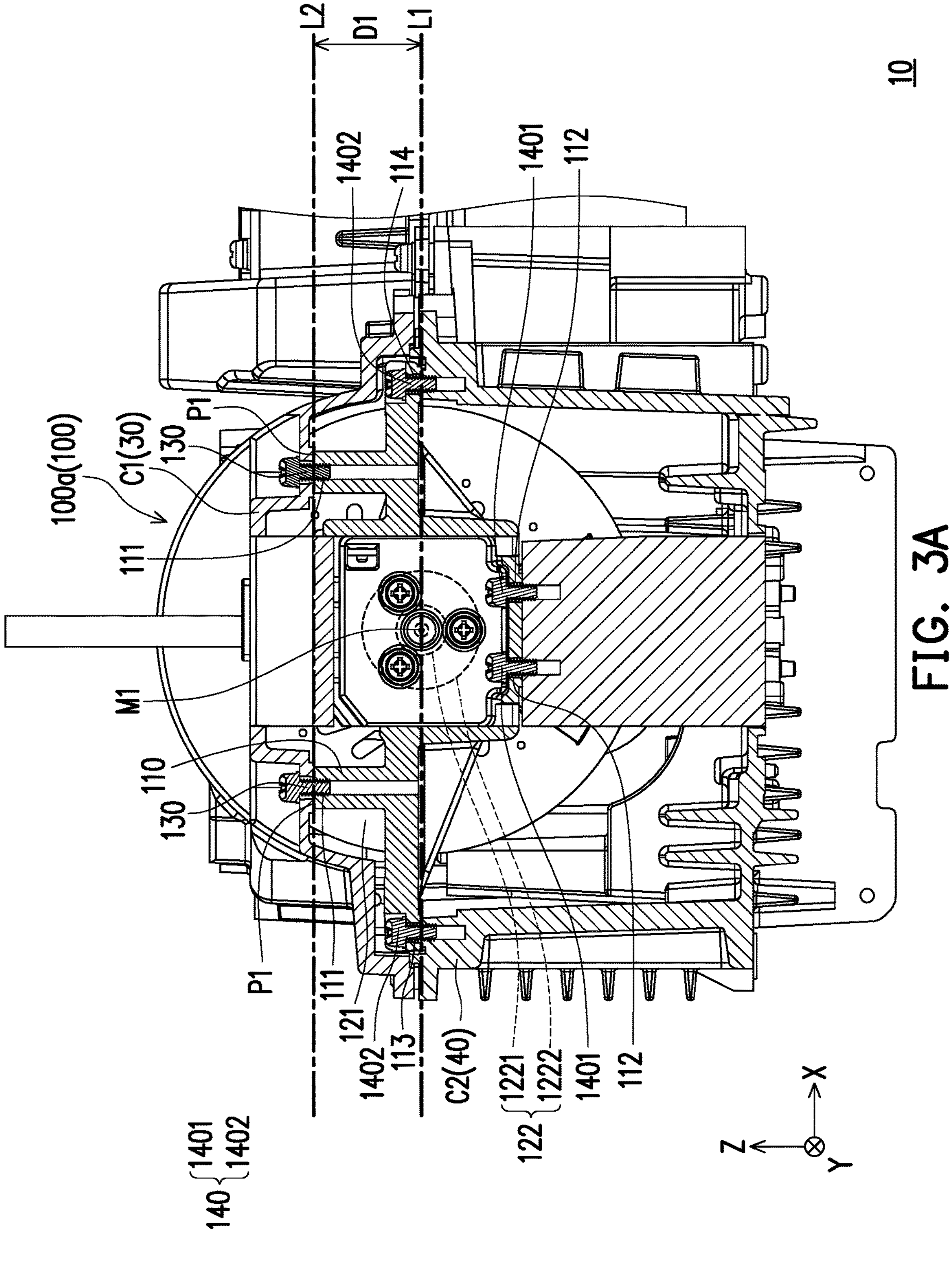
FIG. 3A is a cross-sectional view of the projection device of FIG. 2A along a section line A-A.
Figure 3B:
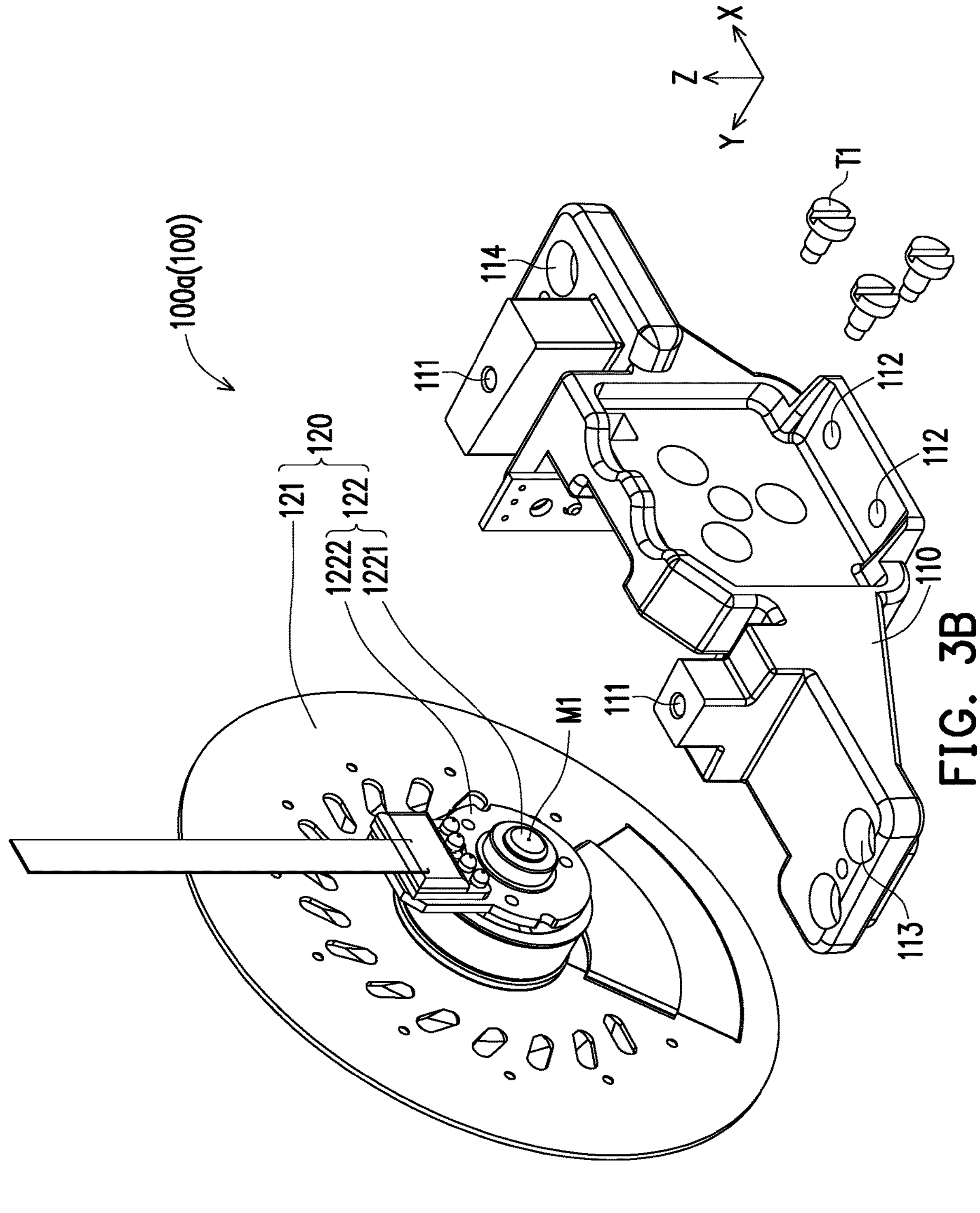
FIG. 3B is a schematic exploded view of a phosphor color wheel module of FIG. 2A.
Figure 3C:
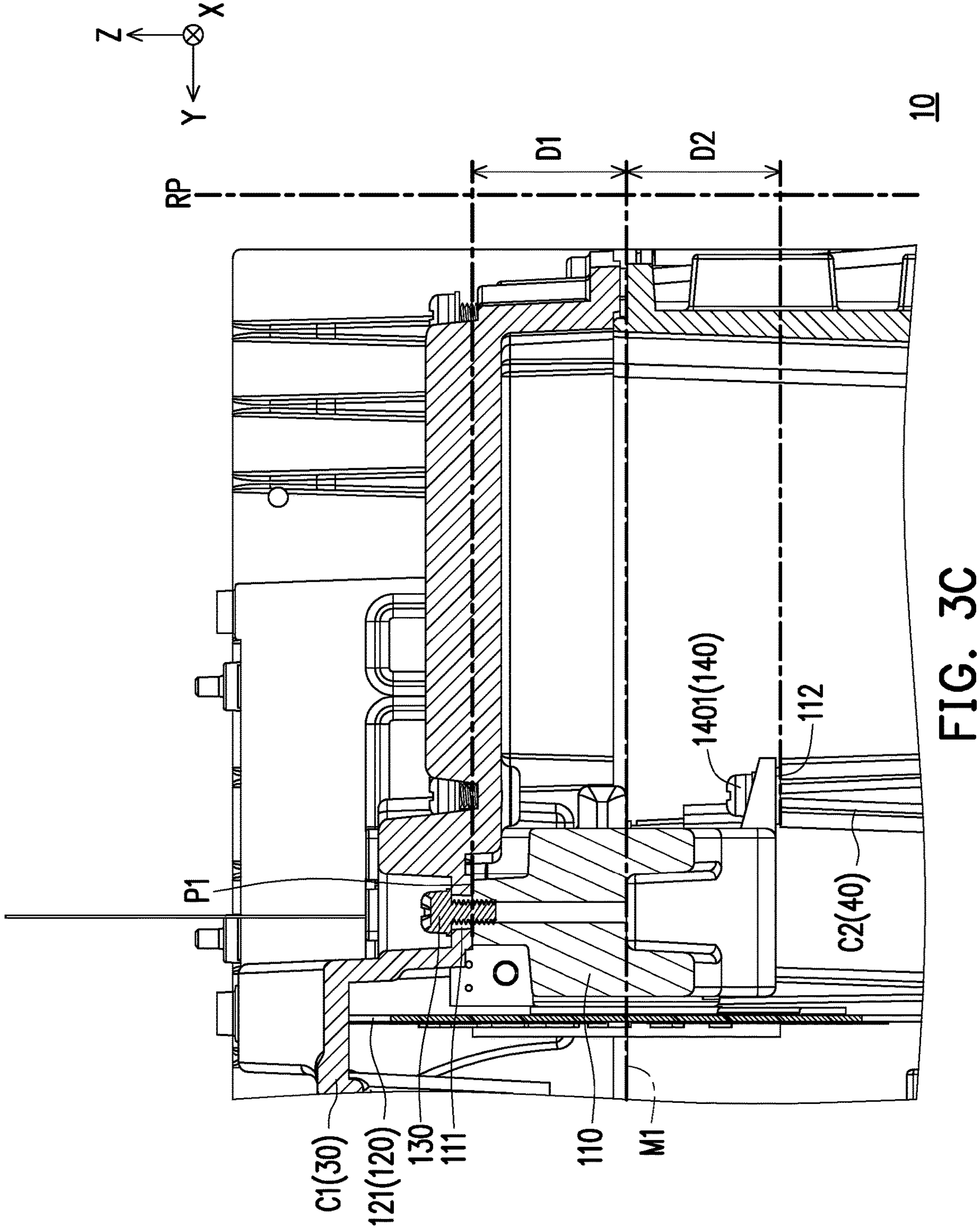
FIG. 3C is a cross-sectional view of the projection device of FIG. 2A along a section line B-B.

FIG. 3A is a cross-sectional view of the projection device of FIG. 2A along a section line A-A. FIG. 3B is a schematic exploded view of the phosphor color wheel module of FIG. 2A. FIG. 3C is a cross-sectional view of the projection device of FIG. 2A along a section line B-B. In the embodiment, the phosphor color wheel module 100*a* includes a fixing base 110, an optical assembly 120, a first connecting assembly 130 and a second connecting assembly 140. The optical assembly 120 includes a disk 121 and a driving assembly 122. The driving assembly 122 is connected to a center of the disk 121 for driving the disk 121 to rotate around a central axis M1 thereof. The central axis M1 of the disk 121, for example, passes through the center and an extending direction of the central axis M1 is, for example, parallel to the Y axis.

In the embodiment, the fixing base 110 is connected to the driving assembly 122. Specifically, the driving assembly 122 of the optical assembly 120 includes a rotating shaft 1221 and a driving element 1222. The rotating shaft 1221 of the driving assembly 122 is connected to the center of the disk 121, and the driving element 1222 is connected to the rotating shaft 1221 to drive the rotating shaft 1221, so as to drive the disk 121 to rotate. In the embodiment, the optical assembly 120 is, for example, a phosphor color wheel, the driving element 1222 is, for example, a motor, and the rotating shaft 1221 is, for example, a motor rotating shaft. Specifically, the fixing base 110 is connected to the driving element 1222 through a plurality of locking members T1, and the locking members T1 are, for example, screws for screw-locking the fixing base 110 to one end of the driving element 1222. Since the fixing base 110 and the disk 121 are in contact and fixed through the driving assembly 122, the heat of the disk 121 may be directly introduced into the fixing base 110, which helps dissipating heat and improving heat dissipation efficiency.

In detail, in the embodiment, the fixing base 110 has a first connecting portion 111 and a second connecting portion 112, and the first casing member 30 of the projection device 10 is connected to the second casing member 40. When the fixing base 110 is locked on the driving assembly 122, in the projection device 10, the first connecting portion 111 of the fixing base 110 is closer to the first casing member 30 than the second connecting portion 112, and the second connecting portion 112 is closer to the second casing member 40 than the first connecting portion 111.

In the embodiment, on a reference plane RP (an X-Z plane, shown in FIG. 3C) perpendicular to the central axis M1 of the disk 121, an orthogonal projection of the first connecting portion 111 of the fixing base 110 and an orthogonal projection of the second connecting portion 112 of the fixing base 110 are respectively located on two sides of the central axis M1. To be specific, the first connecting portion 111 of the fixing base 110 is connected to the first casing member 30 through the first connecting assembly 130, and the second connecting portion 112 of the fixing base 110 is connected to the second casing member 40 through the second connecting assembly 140. In the embodiment, the first connecting assembly 130 includes two locking parts for correspondingly locking the first connecting portion 111 of the fixing base 110, and the second connecting assembly 140 includes six locking parts, and the locking parts are, for example, screws or other elements with threads, but the invention is not limited thereto. In other embodiments, as long as the connecting assemblies have a fixing function, the form and quantity thereof are not limited by the invention.

In the embodiment, the fixing base 110 further includes a third connecting portion 113 and a fourth connecting portion 114. The third connecting portion 113 and the fourth connecting portion 114 are located between the first connecting portion 111 and the second connecting portion 112.

In the embodiment, on the reference plane (X-Z plane) RP, an orthogonal projection of the third connecting portion 113 and an orthogonal projection of the fourth connecting portion 114 of the fixing base 110 form a first connection line L1, the orthogonal projection of the connecting portion 111 and the orthogonal projection of the second connecting portion 112 are located on two opposite sides of the first connection line L1. In the embodiment, in the embodiment, on the reference plane RP perpendicular to the central axis M1, the first connection line L1 passes through the central axis M1 of the disk 121, and an advantage of such design is that the first connecting portion 111 of the fixing base 110 is connected to the first casing member 30, the second connecting portion 112 of the fixing base 110 is connected to the second casing member 40 to make the structure of the fixing base 110 and the optical assembly 120 connected to the fixing base 110 more stable, and the disk 121 of the optical assembly 120 is less likely to shake when rotating.

In an embodiment, as shown in FIG. 3A, the first connecting portion 111 of the fixing base 110 includes two locking surfaces P1 arranged at intervals, and orthogonal projections of the two locking surfaces P1 on the reference plane RP (shown in FIG. 3C) perpendicular to the central axis M1 of the disk 121 form a second connection line L2, and the second connection line L2 and the first connection line L1 are substantially parallel to each other and have a first distance D1. In an embodiment, as shown in FIG. 3C, on the reference plane RP perpendicular to the central axis M1 of the disk 121, there is a second distance D2 between the orthogonal projection of the second connecting portion 112 and the first connection line L1, and the distance D1 is substantially the same as the second distance D2.

In the embodiment, the first connecting assembly 130 locks the first casing member 30 with the two locking surfaces P1 of the first connecting portion 111 of the fixing base 110 along a direction (a Z axis direction) perpendicular to the central axis M1, a first part 1401 (for example, two locking parts) of the second connecting assembly 140 locks the second casing member 40 with the second connecting portion 112 of the fixing base 110 along the direction (the Z axis direction) perpendicular to the central axis M1, and a second part 1402 (for example, four locking parts, which are shown in FIG. 2B) of the second connecting assembly 140 locks the second casing member 40 with the third connecting portion 113 and the fourth connecting portion 114 of the fixing base 110 along the direction (the Z axis direction) perpendicular to the central axis M1. In the embodiment, the first connecting assembly 130 and the second connecting assembly 140 are, for example, multiple locking elements with threads, and the two locking surfaces P1 of the first connecting portion 111, the second connecting portion 112, the third connecting portion 113 and the fourth connecting portion 114 of the fixing base 110 have screw holes respectively corresponding to the locking elements.

In the embodiment, the first casing member 30 is an upper cover C1 of the illumination system 50, the second casing member 40 is a lower cover C2 of the illumination system 50, and the phosphor color wheel module 100*a* is disposed in a space enclosed by the upper cover C1 and the lower cover C2, and the fixing base 110 of the phosphor color wheel module 100*a* is locked to the upper cover C1 and the lower cover C2 respectively through the first connecting portion 111 and the second connecting portion 112 designed symmetrically with respect to the central axis M1.

In the embodiment, a material of the fixing base 110 is a zinc alloy, and since a weight of the zinc alloy is higher, a shock resistance capability is better, and the related structure is strengthened and heavy, and an average thickness of the fixing base 110 reaches 6 mm, but the invention is not limited thereto.

In this way, during the operation of the projection device 10, the first connecting assembly 130 may fasten the upper cover C1 and the fixing base 110 to each other, and the second connecting assembly 140 may fasten the lower cover C2 and the fixing base 110 to each other to reduce vibration and noise generated at high speeds (such as a rotation speed of 10800 rpm or 14400 rpm). Under the above configuration, the DLP projector with a rotation speed of 7200 rpm may also achieve a lower noise value. In addition, when the color wheel module with the rotation speed of 14400 rpm is applied to a 2K projector, it also has the effect of improving brightness.

Other embodiments are provided below for further description. It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 4:
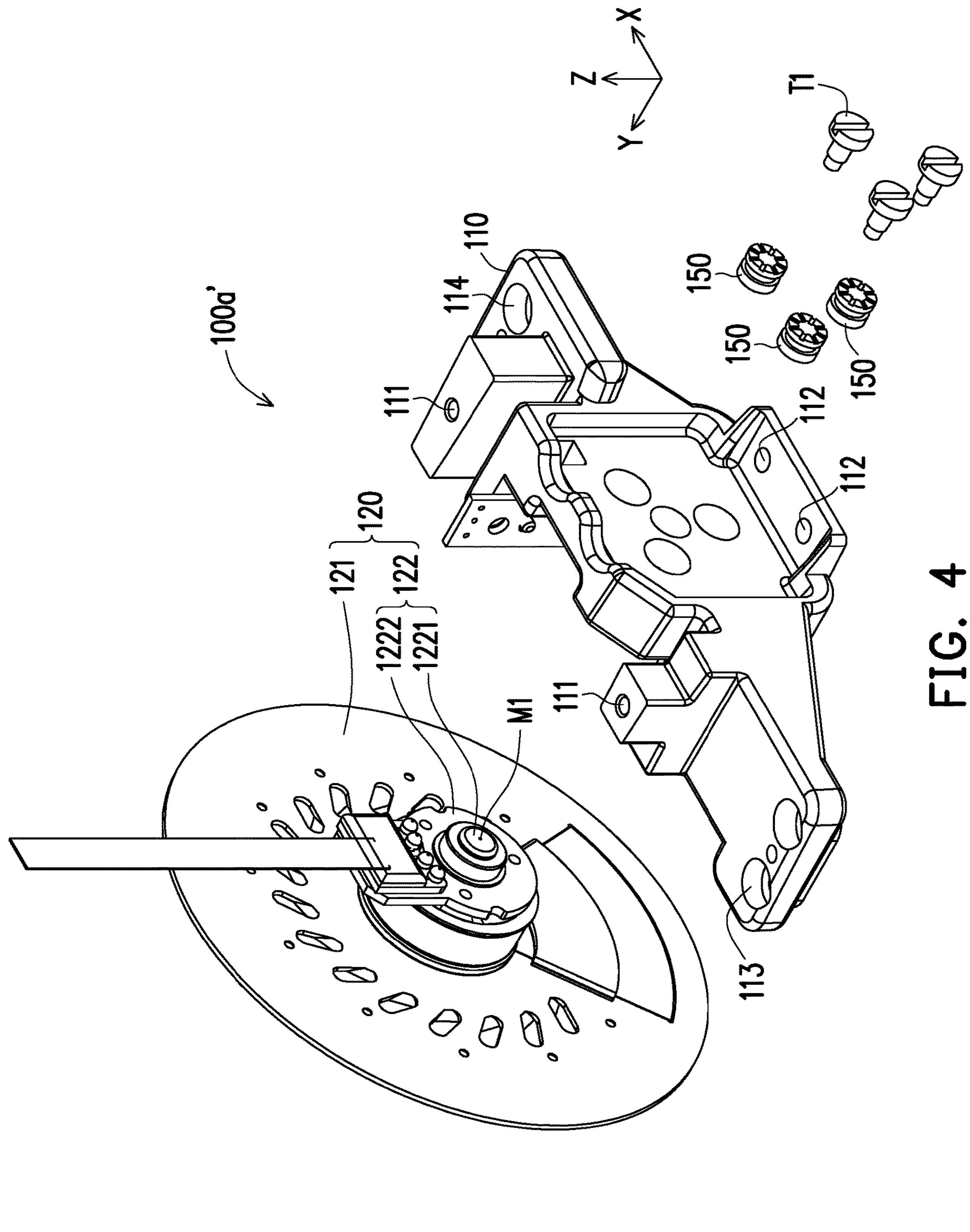
FIG. 4 is a schematic exploded view of a phosphor color wheel module according to another embodiment of the invention.

FIG. 4 is a schematic exploded view of a phosphor color wheel module according to another embodiment of the invention. In the embodiment, a phosphor color wheel module 100*a*' includes a plurality of buffer members 150, and the plurality of buffer members 150 are respectively located between the plurality of locking members T1 and the fixing base 110, for example, the fixing base 110 is provided with corresponding locking holes (not indicated) corresponding to the locking members T1. Since the buffer members 150 disposed between the fixing base body 110 and the driving element 1222 may provide a buffer effect, vibration and noise generated when the disk 121 operates at a high speed may be avoided. The buffer member 150 is, for example, an elastic member such as a rubber or a sponge, etc.

Figure 5:
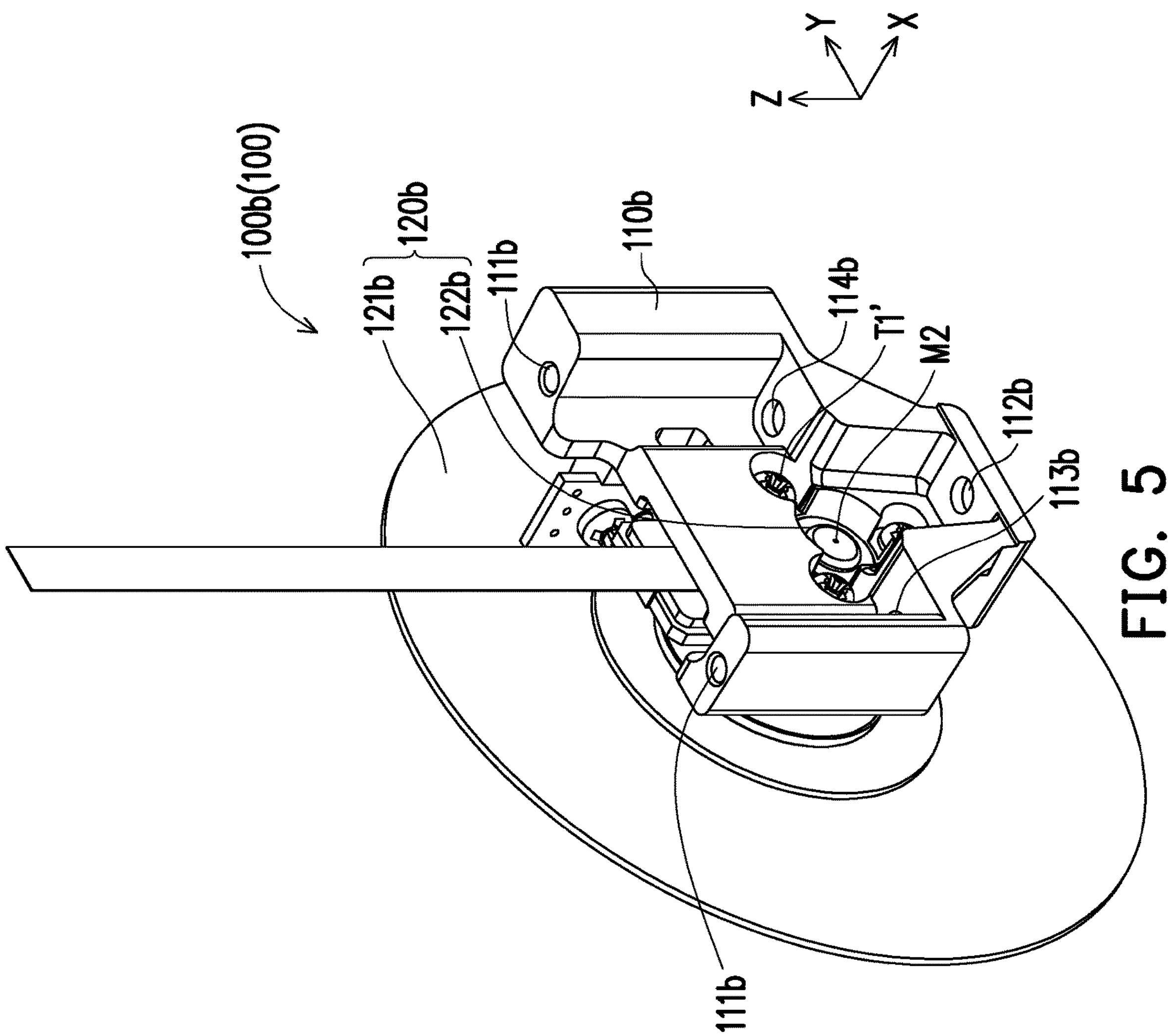
FIG. 5 is a schematic diagram of a filter color wheel module of FIG. 2A.
Figure 6:
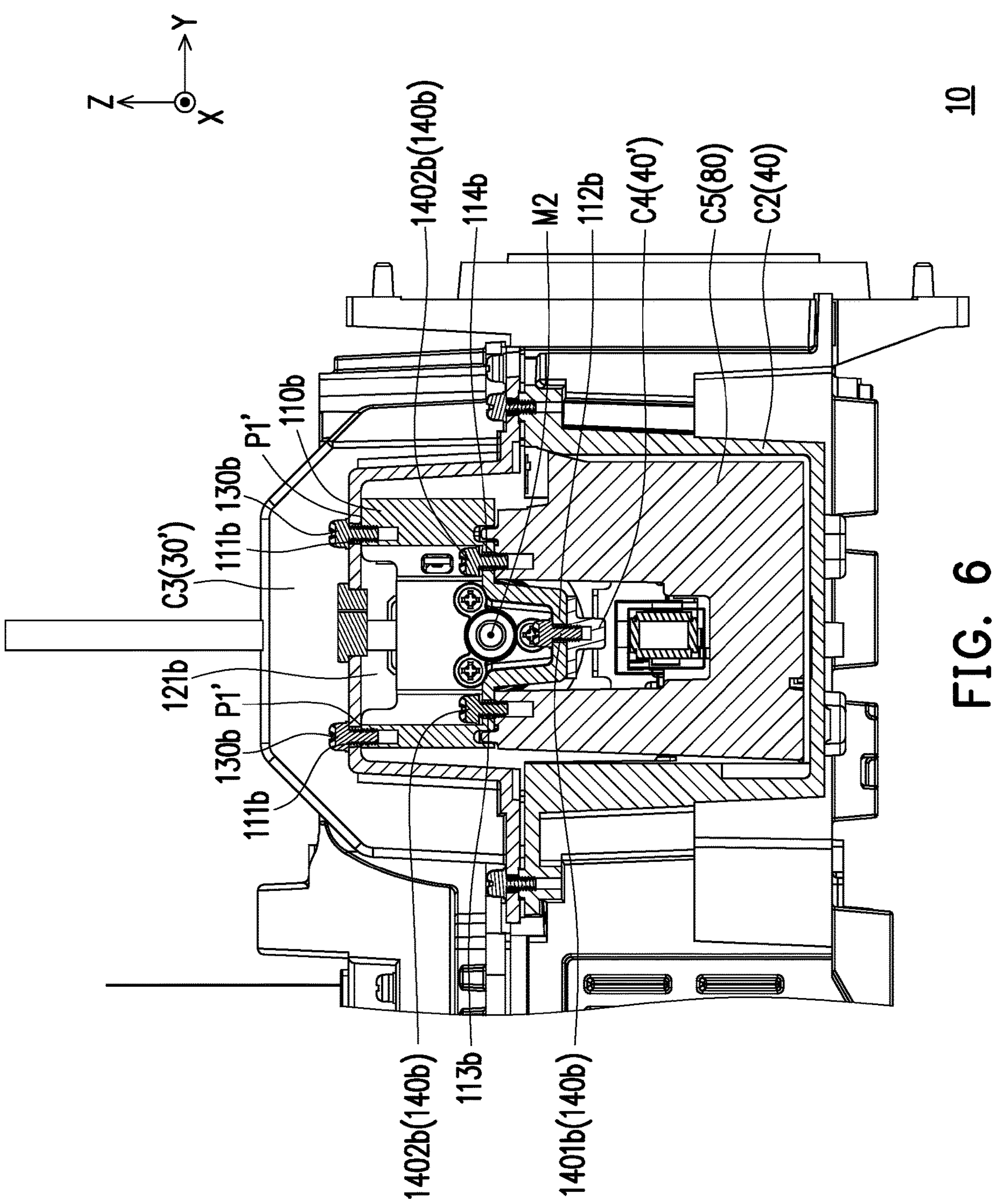
FIG. 6 is a cross-sectional view of the projection device of FIG. 2A along a section line C-C.
Figure 7:
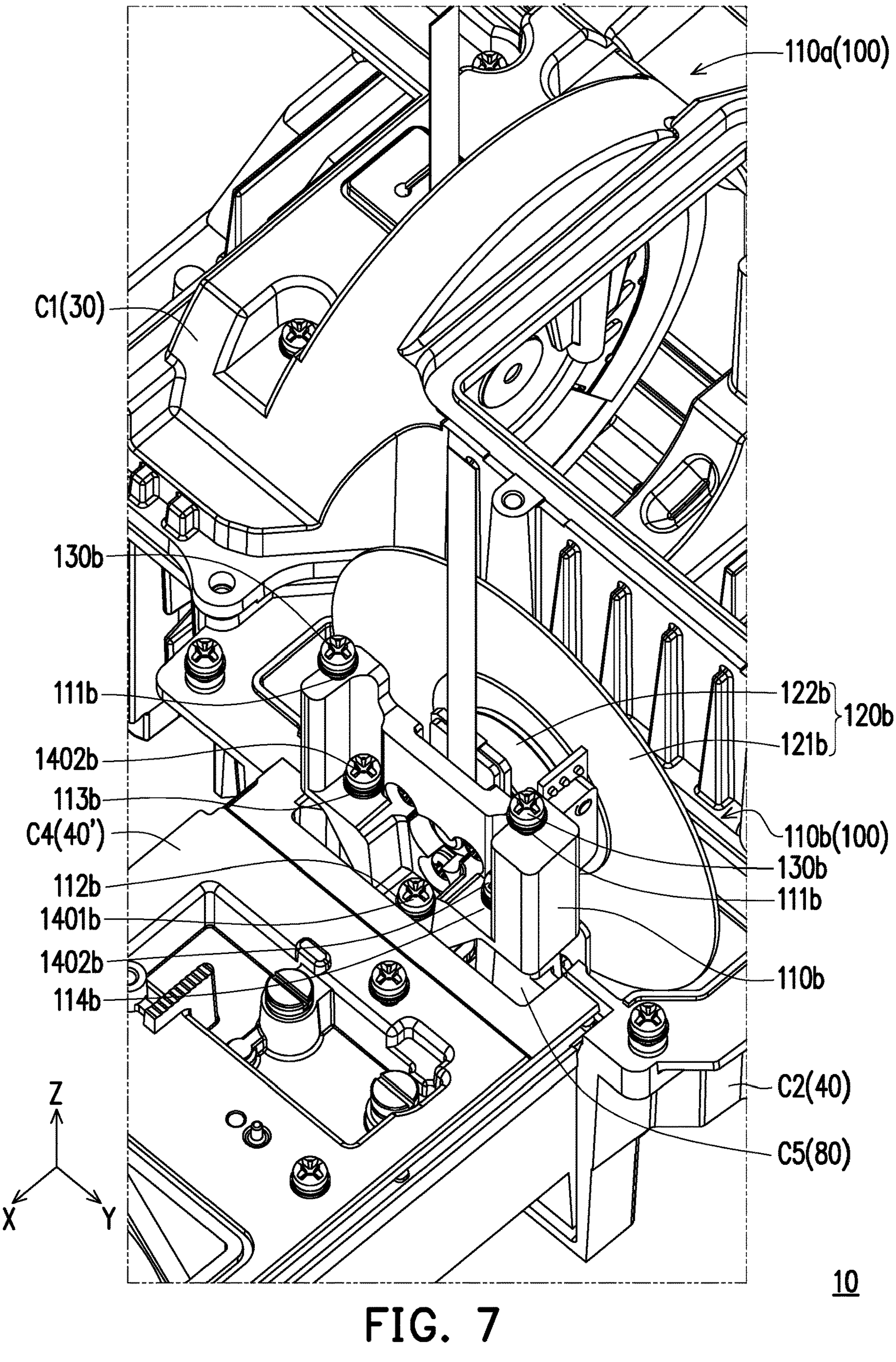
FIG. 7 is a partial schematic diagram of another viewing angle of the projection device of FIG. 2A.

FIG. 5 is a schematic diagram of a filter color wheel module of FIG. 2A. FIG. 6 is a cross-sectional view of the projection device of FIG. 2A along a section line C-C. FIG. 7 is a partial schematic diagram of another viewing angle of the projection device of FIG. 2A. It should be noted that the first casing member (cover) is omitted in FIG. 7 to clearly illustrate its internal components.

In the embodiment, a color filter wheel module 100*b* includes a fixing base 110*b*, an optical assembly 120*b*, a first connecting assembly 130*b* and a second connecting assembly 140*b*. The optical assembly 120*b* includes a disk 121*b* and a driving assembly 122*b*. The driving assembly 122*b* is connected to a center of the disk 121*b* to drive the disk 121*b* to rotate around a central axis M2 thereof, and an extending direction of the central axis M2 is, for example, parallel to the X-axis. In the embodiment, the optical assembly 120*b* is, for example, a filter wheel, and the driving assembly 122*b* includes a motor (driving element) and a motor shaft, but the invention is not limited thereto.

In the embodiment, the fixing base 110*b* is connected to the driving element 122*b* through a plurality of locking members T1', and the locking members T1' are, for example, screws for screw-locking the fixing base 110*b* to one end of the driving element (motor). Since the fixing base 110*b* and the disk 121*b* are in contact and fixed through the driving assembly 122*b*, the heat of the disk 121*b* may be directly introduced into the fixing base 110*b* through the driving assembly 122*b*, which helps dissipating heat and improving heat dissipation efficiency, but the invention is not limited thereto. In other embodiments, a plurality of buffer members are respectively located between the plurality of locking members and the fixing base, for example, the fixing base body 110*b* is provided with lock holes (not indicated) corresponding to the locking members T1', which may provide a buffering effect to avoid generating vibration and noise during high-speed operation.

In the embodiment, the fixing base 110*b* has a first connecting portion 111*b* and a second connecting portion 112*b*, and the first casing member 30' is connected to the second casing member 40'. When the fixing base 110*b* is locked on the driving assembly 122*b*, in the projection device 10, the first connecting portion 111*b* of the fixing base 110*b* is closer to the first casing member 30' than the second connecting portion 112*b*, and the second connecting portion 112*b* is closer to the second casing member 40' than the first connecting portion 111*b*.

In the embodiment, the first connecting portion 111*b* includes two locking surfaces P1' arranged at intervals, and the fixing base 110*b* further includes a third connecting portion 113*b* and a fourth connecting portion 114*b*. The third connecting portion 113*b* and the fourth connecting portion 114*b* are located between the first connecting portion 111*b* and the second connecting portion 112*b*. On a reference plane perpendicular to the central axis M2, an orthogonal projection of the first connecting portion 111*b* of the fixing base 110*b* and an orthogonal projection of the second connecting portion 112*b* are respectively located on two sides of the central axis M2.

In the embodiment, the first casing member 30' is a cover part C3 for covering a part of the optical assembly 120*b* (color filter wheel), the second casing member 40' is an optical engine upper cover C4 of the projection device 10, and the optical assembly 120*b* (i.e., the filter color wheel) is disposed in a space enclosed by the first casing member 30' (cover C3) and the second casing member 40' (optical engine upper cover C4).

In the embodiment, in addition to being locked to the fixing base, the cover part C3 is further locked to the lower cover C2 of the illumination system 50 and the optical engine upper cover C4 of the projection device 10. The projection device 10 further includes a third casing member 80, which is an optical engine lower cover C5. The optical engine upper cover C4 and the optical engine lower cover C5 are connected, and the light valve 60 is accommodated in a space enclosed by the optical engine upper cover C4 and the optical engine lower cover C5.

In the embodiment, the first connecting assembly 130*b* locks the first casing member 30' with the two locking surfaces P1' of the first connecting portion 111*b* of the fixing base 110*b* along a direction (the Z axis direction) perpendicular to the central axis M2, a first part 1401*b* of the second connecting assembly 140*b* locks the second casing member 40' with the second connecting portion 112*b* of the fixing base 110*b* along the direction (the Z axis direction) perpendicular to the central axis M2, and a second part 1402*b* of the second connecting assembly 140*b* locks the third casing member 80 with the third connecting portion 113*b* and the fourth connecting portion 114*b* of the fixing base 110*b* along the direction (the Z axis direction) perpendicular to the central axis M2. In the embodiment, the first connecting assembly 130*b* and the second connecting assembly 140*b* are, for example, multiple locking elements with threads, and the two locking surfaces P1' of the first connecting portion 111*b*, the second connecting portion 112*b*, the third connecting portion 113*b* and the fourth connecting portion 114*b* of the fixing base 110*b* have screw holes respectively corresponding to the locking elements.

In this way, during the operation of the projection device 10, the first connecting assembly 130*b* may fasten the first casing member 30' (cover C3) and the fixing base 110*b* to each other, and the second connecting assembly 140*b* may fasten the second casing member 40' (optical engine upper cover C4) and the third casing member 80 (optical engine lower cover C5) with the fixing base 110 to each other, so as to reduce vibration and noise generated at the high rotation speeds (for example, a rotation speed of 10800 rpm or 14400 rpm).

In summary, the embodiments of the invention have at least one of the following advantages or effects. In the embodiment of the invention, the color wheel module includes the fixing base, which is connected to the first casing member of the projection device through the first connecting portion of the fixing base, the second connecting portion of the fixing base is connected to the second casing member of the projection device, so that the structure of the color wheel module may be stabilized to avoid producing vibration and noise at a high rotation speed. In this way, image quality may be further improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising a casing, an illumination system, a light valve, a first casing member, a second casing member and a projection lens, wherein the illumination system, the light valve, the first casing member, the second casing member and at least a part of the projection lens are arranged in the casing;

the illumination system is configured to provide an illumination light beam, the illumination system comprises a color wheel module, the color wheel module comprises a fixing base, an optical assembly, a first connecting assembly and a second connecting assembly, the optical assembly comprises a disk and a driving assembly, the driving assembly is connected to a center of the disk for driving the disk to rotate around a central axis thereof, the fixing base is connected with the driving assembly, and the fixing base has a first connecting portion and a second connecting portion, on a reference plane perpendicular to the central axis, an orthogonal projection of the first connecting portion of the fixing base and an orthogonal projection of the second connecting portion are respectively located on two sides of the central axis, wherein the first casing member is connected to the second casing member, the first connecting portion of the fixing base is connected to the first casing member through the first connecting assembly, and the second connecting portion of the fixing base is connected to the second casing member through the second connecting assembly, wherein the first casing member is an upper cover of the illumination system, the second casing member is a lower cover of the illumination system, and the color wheel module is disposed in a space enclosed by the first casing member and the second casing member;

the light valve is disposed on a transmission path of the illumination light beam, and is configured to convert the illumination light beam into an image light beam; and the projection lens is disposed on a transmission path of the image light beam, and is configured to project the image light beam out of the projection device.

2. The projection device as claimed in claim 1, wherein the driving assembly of the optical assembly comprises a rotating shaft and a driving element, the rotating shaft is connected to the center of the disk, the driving element is connected to the rotating shaft to drive the rotating shaft and drive the disk to rotate, and the fixing base is connected to the driving element.

3. The projection device as claimed in claim 1, wherein the fixing base further comprises a third connecting portion and a fourth connecting portion, on the reference plane, an orthogonal projection of the third connecting portion and an orthogonal projection of the fourth connecting portion form a first connection line, and the orthogonal projection of the first connecting portion and the orthogonal projection of the second connecting portion are located on two opposite sides of the first connection line.

4. The projection device as claimed in claim 3, wherein the optical assembly is a phosphor color wheel, and on the reference plane, the first connection line passes through the central axis of the disk.

5. The projection device as claimed in claim 4, wherein the first connecting portion comprises two locking surfaces, an orthogonal projection of the two locking surfaces on the reference plane forms a second connection line, the second connection line is substantially parallel to the first connection line and there is a first distance there between, there is a second distance between the orthogonal projection of the second connecting portion and the first connection line, and the first distance is substantially the same as the second distance.

6. The projection device as claimed in claim 4, wherein the first connecting assembly and the second connecting assembly respectively comprise a plurality of locking parts, the first connecting portion comprises two locking surfaces, and the first connecting assembly locks the first casing member with the two locking surfaces of the first connecting portion along a direction perpendicular to the central axis, a part of the second connecting assembly locks the second casing member with the second connecting portion along the direction perpendicular to the central axis, and another part of the second connecting assembly locks the second casing member with the third connecting portion and the fourth connecting portion along the direction perpendicular to the central axis.

7. A projection device, comprising a casing, an illumination system, a light valve, a first casing member, a second casing member and a projection lens, wherein the illumination system, the light valve, the first casing member, the second casing member and at least a part of the projection lens are arranged in the casing;

the illumination system is configured to provide an illumination light beam, the illumination system comprises a color wheel module, the color wheel module comprises a fixing base, an optical assembly, a first connecting assembly and a second connecting assembly, the optical assembly comprises a disk and a driving assembly, the driving assembly is connected to a center of the disk for driving the disk to rotate around a central axis thereof, the fixing base is connected with the driving assembly, and the fixing base has a first connecting portion and a second connecting portion, on a reference plane perpendicular to the central axis, an orthogonal projection of the first connecting portion of the fixing base and an orthogonal projection of the second connecting portion are respectively located on two sides of the central axis, wherein the first casing member is connected to the second casing member, the first connecting portion of the fixing base is connected to the first casing member through the first connecting assembly, and the second connecting portion of the fixing base is connected to the second casing member through the second connecting assembly, wherein the optical assembly is a filter color wheel, the first casing member is a cover part, the second casing member is an optical engine upper cover of the projection device, and the filter color wheel is disposed in a space enclosed by the first casing member and the second casing member;

the light valve is disposed on a transmission path of the illumination light beam, and is configured to convert the illumination light beam into an image light beam; and the projection lens is disposed on a transmission path of the image light beam, and is configured to project the image light beam out of the projection device.

8. The projection device as claimed in claim 7, wherein the cover part is locked to a lower cover of the illumination system and the optical engine upper cover of the projection device, the optical engine upper cover is connected with an optical engine lower cover, and the light valve is accommodated in a space enclosed by the optical engine upper cover and an optical engine lower cover.

9. The projection device as claimed in claim 8, wherein the first connecting assembly and the second connecting assembly respectively comprise a plurality of locking parts, the first connecting portion comprises two locking surfaces, and the first connecting assembly locks the first casing member with the two locking surfaces of the first connecting portion along a direction perpendicular to the central axis, a part of the second connecting assembly locks the second casing member with the second connecting portion along the direction perpendicular to the central axis, and another part of the second connecting assembly locks the optical engine lower cover with the third connecting portion and the fourth connecting portion along the direction perpendicular to the central axis.

10. The projection device as claimed in claim 1, wherein the first connecting assembly and the second connecting assembly respectively comprise a plurality of locking parts, the color wheel module further comprises a plurality of buffer members, and the plurality of buffer members are located between the plurality of locking parts and the fixing base.

11. A color wheel module, adapted to be disposed between a first casing member and a second casing member of a projection device, the color wheel module comprising a fixing base, an optical assembly, a first connecting assembly and a second connecting assembly, wherein the optical assembly comprises a disk and a driving assembly, the driving assembly is connected to a center of the disk for driving the disk to rotate around a central axis thereof, the fixing base is connected with the driving assembly, and the fixing base has a first connecting portion and a second connecting portion, on a reference plane perpendicular to the central axis, an orthogonal projection of the first connecting portion of the fixing base and an orthogonal projection of the second connecting portion of the fixing base are respectively located on two sides of the central axis, the first casing member is connected to the second casing member, the first connecting portion of the fixing base is connected to the first casing member through the first connecting assembly, and the second connecting portion of the fixing base is connected to the second casing member through the second connecting assembly, wherein the first casing member is an upper cover of the illumination system, the second casing member is a lower cover of the illumination system, and the color wheel module is disposed in a space enclosed by the first casing member and the second casing member.

12. The color wheel module as claimed in claim 11, wherein the driving assembly of the optical assembly comprises a rotating shaft and a driving element, the rotating shaft is connected to the center of the disk, the driving element is connected to the rotating shaft to drive the rotating shaft and drive the disk to rotate, and the fixing base is connected to the driving element.

13. The color wheel module as claimed in claim 11, wherein the fixing base further comprises a third connecting portion and a fourth connecting portion, on the reference plane, an orthogonal projection of the third connecting portion and an orthogonal projection of the fourth connecting portion form a first connection line, and the orthogonal projection of the first connecting portion and the orthogonal projection of the second connecting portion are located on two opposite sides of the first connection line.

14. The color wheel module as claimed in claim 13, wherein the optical assembly is a phosphor color wheel, and on the reference plane, the first connection line passes through the central axis of the disk.

15. The color wheel module as claimed in claim 14, wherein the first connecting portion comprises two locking surfaces, an orthogonal projection of the two locking surfaces on the reference plane forms a second connection line, the second connection line is substantially parallel to the first connection line and there is a first distance there between, there is a second distance between the orthogonal projection of the second connecting portion and the first connection line, and the first distance is substantially the same as the second distance.

16. The color wheel module as claimed in claim 14, wherein the first connecting assembly and the second connecting assembly respectively comprise a plurality of locking parts, the first connecting portion comprises two locking surfaces, and the first connecting assembly locks the first casing member with the two locking surfaces of the first connecting portion along a direction perpendicular to the central axis, a part of the second connecting assembly locks the second casing member with the second connecting portion along the direction perpendicular to the central axis, and another part of the second connecting assembly locks the second casing member with the third connecting portion and the fourth connecting portion along the direction perpendicular to the central axis.

17. The projection device as claimed in claim 7, wherein the optical assembly is a filter color wheel, and the projection device further comprises a third casing member.

18. The projection device as claimed in claim 17, wherein the first connecting assembly and the second connecting assembly respectively comprise a plurality of locking parts, the first connecting portion comprises two locking surfaces, and the first connecting assembly locks the first casing member with the two locking surfaces of the first connecting portion along a direction perpendicular to the central axis, a part of the second connecting assembly locks the second casing member with the second connecting portion along the direction perpendicular to the central axis, and another part of the second connecting assembly locks the third casing member with the third connecting portion and the fourth connecting portion along the direction perpendicular to the central axis.

19. The color wheel module as claimed in claim 11, wherein the first connecting assembly and the second connecting assembly respectively comprise a plurality of locking parts, the color wheel module further comprises a plurality of buffer members, and the plurality of buffer members are respectively located between the plurality of locking parts and the fixing base.

* * * * *